June 16, 1942.  F. F. MILLER, JR  2,286,498
UNIVERSAL JOINT
Filed Sept. 21, 1939   2 Sheets-Sheet 1
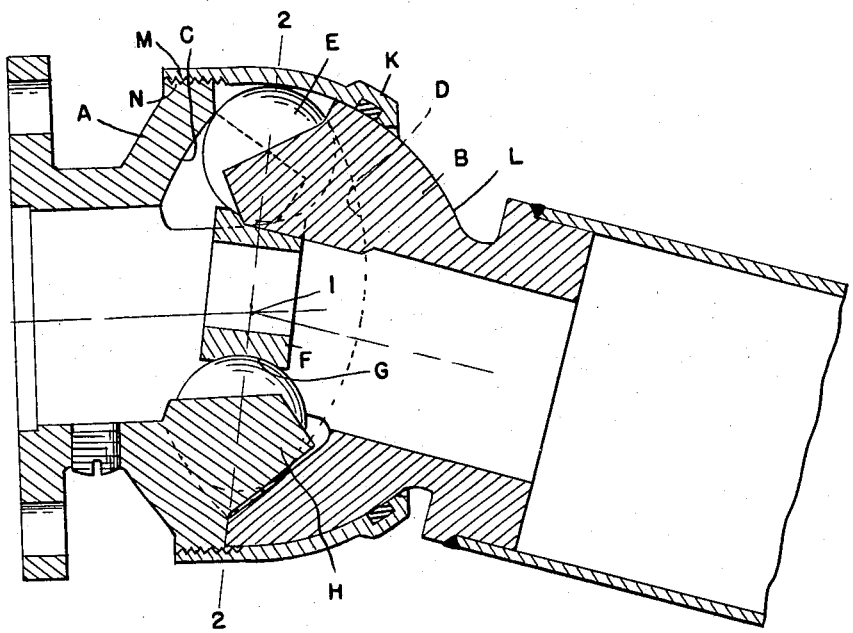
FIG.I.
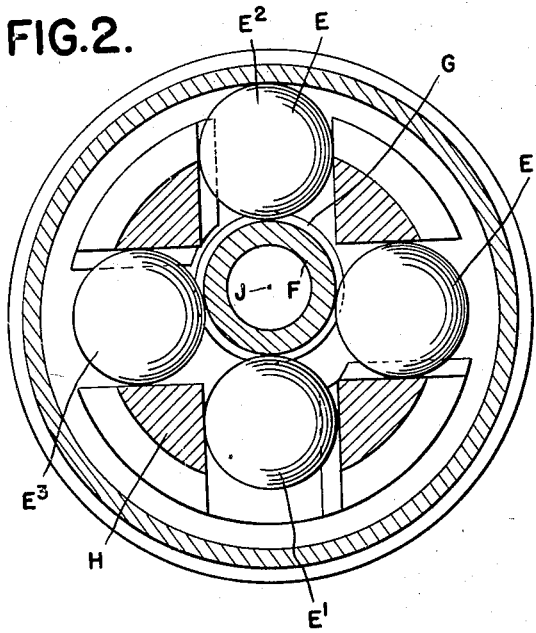
FIG.2.
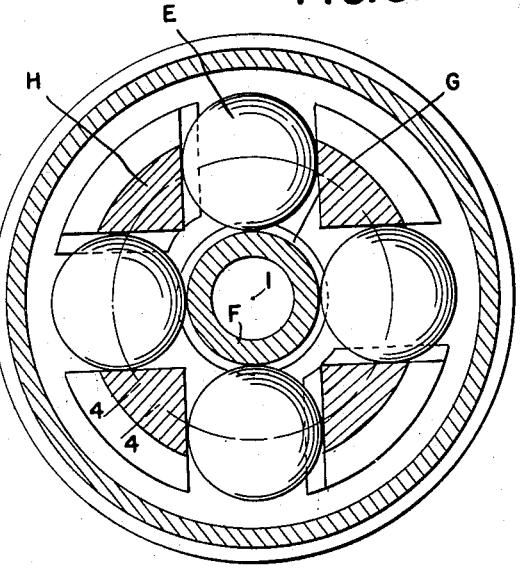
FIG.3.
INVENTOR.
FRED F. MILLER JR.
BY *Whittemore Hulbert & Belknap*
ATTORNEYS June 16, 1942.  F. F. MILLER, JR  2,286,498
UNIVERSAL JOINT
Filed Sept. 21, 1939   2 Sheets-Sheet 2

INVENTOR.
FRED F. MILLER JR.
BY *Whittemore Hulbert + Belknap*
ATTORNEYS

Patented June 16, 1942

2,286,498

UNITED STATES PATENT OFFICE 2,286,498

UNIVERSAL JOINT

Fred F. Miller, Jr., Ferndale, Mich., assignor to Gear Grinding Machine Company, Hamtramck, Mich., a corporation of Michigan Application September 21, 1939, Serial No. 295,967

10 Claims. (Cl. 64—21)

The invention relates to torque transmitting universal joints of that type commonly known as constant velocity, but which might be more accurately described as constant ratio. It is the primary object of the invention to obtain a simplified construction which can be manufactured at relatively low cost. It is a further object to obtain a construction having a high degree of strength and capable of transmitting relatively heavy loads. With these objects in view, the invention consists in the construction as hereinafter set forth.

In the drawings:

Figure 1 is a cross section through my improved universal joint;

Figure 2 is a longitudinal section substantially on line 2—2 of Figure 1;

Figure 3 is a view similar to Figure 1, showing the position of the balls when the axes of the two members are in alignment;

Figure 4:
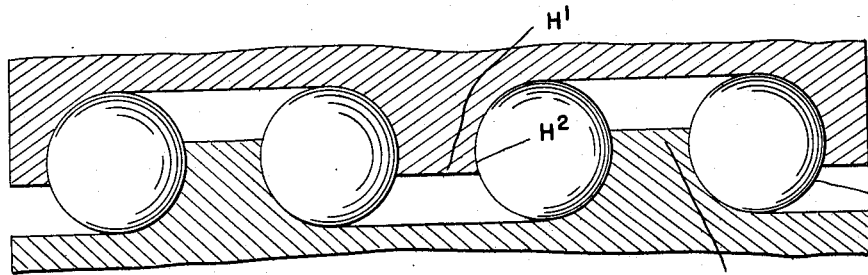
Figure 4 is a developed sectional view substantially on line 4—4 of Figure 3.

In the present state of the art various constructions of universal joints have been devised in which torque is transmitted between the drive and driven members through the medium of balls. Many of these constructions are not of the constant ratio or constant velocity type, but where this is desired it is essential that the plane of the balls should always bisect the angle between the drive and driven shafts. The instant invention involves in its construction a novel geometrical principle through which a floating system of torque transmitting balls is always maintained in a plane bisecting the angle between the shaft axes.

As illustrated, A and B are the two main members which are provided with opposed concave surfaces C and D, preferably segments of spheres centered in the axes of the respective members and of a radial length considerably greater than the distance between said surfaces. E are balls arranged between and in contact with the surfaces C and D and forming a circular series contacting with a central circular spacer member F. The latter is grooved in its periphery as indicated at G to maintain the balls in a common plane. H are lugs projecting axially from the members A and B and interspersed between the balls. As specifically shown, each of the members A and B is provided with a pair of these lugs which are diametrically opposite and so fashioned as to form in cooperation with the lugs of the opposite member radially extending channels for the balls. Thus while the torque will be transmitted from one member to the other through the medium of the balls and without lost motion, the balls are nevertheless free to move radially in the channels between the lugs.

With the construction thus far described the members A and B are free to oscillate with respect to each other through a limited angle between their axes and the center of movement I will be in the central plane of the balls. However, during such angular movement the approach of the concave surfaces C and D on one side of the axis will force the ball $E'$ on this side radially inward and through the medium of the spacer F will force the diametrically opposite ball $E^2$ radially outward. Thus, the center of the circular series of balls, which when the members A and B are in axial alignment coincides with the center I, will be shifted during this angular movement toward the point J. At the same time, the other pair of balls $E^3$ and $E^4$ will move slightly about the periphery of the spacer F into the position shown in Figure 1. During rotation of the members A and B while their axes are in this angular relation, the balls will gyrate successively moving radially inward on one side and radially outward on the opposite side. Also, the fact that the balls are always in contact with the concave surfaces will insure the holding of the common plane of the series, so as to bisect the angle between the axes.

To retain the members A and B in assembled relation and also to hold the lubricant, an outer jacket K is provided. This, as shown, is of segmental spherical form concentric with the point I' and engaging an outer spherical surface L on the member B. The member K has an internally threaded portion M for engaging a correspondingly threaded flange N on the member A, thereby completing the enclosure.

As shown in Figure 1, the surfaces of the lugs H which form the radial channel are tangent to the balls therebetween at diametrically opposite points. Thus, in transmitting torque the line of thrust is perpendicular to these surfaces, so that there will be no reaction tending to displace the members A and B with respect to each other. If desired, however, the lugs H may be so fashioned as to partly envelop the balls beyond the central plane thereof. Such construction is shown in Figure 4, where the lug $H'$ has the outwardly extending portion $H^2$ curved to fit around the ball, This construction will extend the line of contact through which thrust is transmitted from the lugs to the balls. Assembly of the balls with the lugs is permitted when the members A and B are held in angular relation to each other and separated axially.

Figure 5:
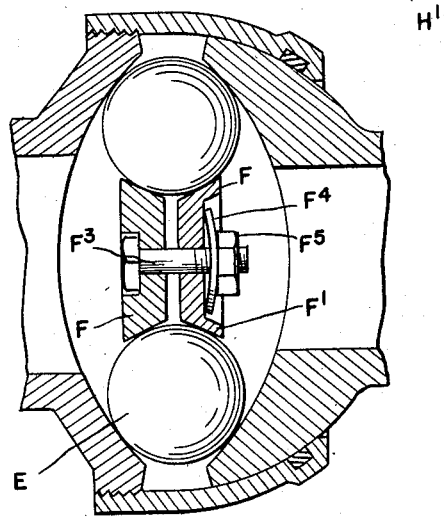
Figure 5 is a cross section showing a modified construction of ball retainer.

As above described, the jacket K and spherical surface L coact to hold the members A and B from separation. There is, however, a slight unavoidable axial movement of these members accompanying the angular movement thereof, so that sufficient clearance must be provided to compensate for this. In the construction shown in Figure 5, I have provided an automatic compensating means which also serves to take up any lost motion occasioned by wear of the parts. In this construction the spacer member F is formed of two members F', F² normally slightly spaced from each other on opposite sides of the plane of the balls. The members are held together by a central bolt F³ with a spring washer or other resilient means F⁴ interposed between the member F' and a nut F⁵. Peripherally the members F', F² are of conical form and when the joint is assembled the pressure of the spherical surfaces C and D against the balls and from the latter against the members F' and F² will separate these members, placing the spring washer F⁴ under tension. When, however, there is any relative axial movement of the members A and B due to angularity which would permit the surfaces C and D to slightly separate, then the washer F⁴ will press the sections F' and F² toward each other, thereby forcing the balls radially outward. In brief, the spacer operates as a resiliently expansible member which will always hold the balls in contact with the spherical surfaces in every position of adjustment.

Figure 6:
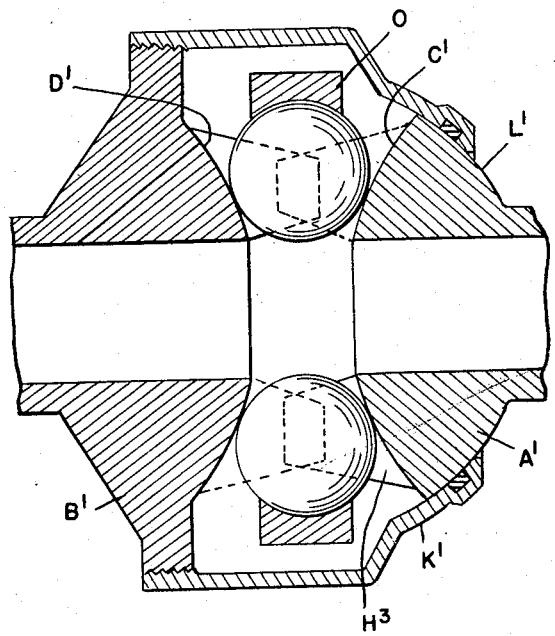
Figure 6 is a longitudinal section of a modified construction of joint.

As thus far described, the spherical surfaces formed by the members A and B are concave, but the functioning of the joint will be substantially the same with opposed convex spherical surfaces. This is illustrated in Figure 6 in which A' and B' are the two members of the joint respectively provided with convex spherical surfaces C' and D'. The balls E are placed between these surfaces and are held in contact therewith by an annular retainer O surrounding the series. The two members A' and B' are held together by a jacket member K' engaging a spherical surface L' similar to the construction shown in Figure 2. Torque transmitting lugs H³ projecting from the members A', B' are interspersed with the balls. Thus, in operation relative angular movement of the axes of the members A', B' is permitted, the balls O gyrating in a similar manner as described in connection with Figure 2.

What I claim as my invention is:

1. A universal joint comprising a pair of members having opposed spherical surfaces centered in the axes of the respective members and spaced from each other by a dimension less than the radius of the sphere, a floating system of balls between said surfaces, and torque transmitting means projecting axially from said members and interspersed with said balls.

2. A universal joint comprising a pair of members having opposed spherical surfaces centered in the axes of the respective members and spaced from each other by a dimension less than the radius of the sphere, a floating system of balls between said surfaces about which said members are free to oscillate, and torque transmitting means projecting from said members interspersed with said balls and together with said spherical surfaces compelling movement of the balls into a plane bisecting the angle between the axes of the members.

3. A universal joint comprising a pair of members having opposed spherical surfaces centered in the axes of the respective members and spaced from each other by a dimension less than the radius of the sphere, a floating system of balls between said surfaces, said system including a retainer for holding said balls in a common plane and substantially equispaced from a common center in said plane, and lugs projecting axially from said members interspersed with said balls to form therewith torque transmitting means, said lugs being fashioned to form radially extending channels through which said balls are free to gyrate.

4. A universal joint comprising a pair of members having opposed spherical surfaces centered in the axes of the respective members and spaced from each other by a dimension less than the radius of the sphere, a floating system of balls between said surfaces, said system including a retainer for holding said balls in a common plane and substantially equispaced from a common center in said plane, and lugs projecting axially from said members interspersed with said balls to form therewith torque transmitting means, said lugs being fashioned to form radially extending channels through which said balls are free to gyrate, being also fashioned to partially envelop said balls on opposite sides of their common plane.

5. A universal joint comprising a pair of members having opposed spherical members centered in the axes of the respective members and spaced from each other by a dimension less than the radius of the sphere, a floating system of balls between said spherical surfaces, said system including four balls spaced from each other and a central peripherally grooved spacer member for maintaining said balls in a common plane, diametrically opposed lugs projecting axially from each member and interspersed with said balls, said lugs having faces for contacting with said balls which are at right angles to each other in the plane of the balls, and the lugs of the two members forming therebetween radially extending channels permitting gyratory movement of the balls therein.

6. A universal joint comprising a pair of members having oppositely extending interspersed lugs fashioned to form therebetween channels extending radially inward in axial planes and having in said planes limiting surfaces which are of opposite arcuate form in the respective members and are spaced from each other by a dimension less than the radius of the arc, balls in said channels, and a retainer for holding said balls in a common plane and substantially equispaced from the common center.

7. A universal joint comprising a pair of members having opposed spherical surfaces centered in the axes of the respective members and spaced from each other by a dimension less than the radius of the sphere, a floating system of balls between said surfaces, said system including a central spacer member for retaining said balls in a common plane, lugs projecting axially from said members interspersed with said balls to form therewith torque transmitting means, and resilient means for circumferentially expanding said spacer to maintain said balls in constant contact with said spherical surfaces.

8. A universal joint comprising a pair of members having opposed spherical concave surfaces centered in the axes of the respective members and spaced from each other by a dimension less than the radius of the sphere, a floating system of balls between said surfaces, and torque transmitting means projecting axially from said members and interspersed with said balls.

9. A universal joint comprising a pair of members having opposed convex spherical surfaces centered in the axes of the respective members and spaced from each other by less than the radius of the sphere, a floating system of balls between said surfaces, and torque transmitting means projecting axially from said members and interspersed with said balls.

10. A universal joint comprising a pair of rotary members having oppositely axially extending interspersed lugs fashioned to form therebetween channels extending radially inward in axial planes and in all portions thereof at an angle greater than 45° to the axes of rotation of the respective members, balls in said channels, and a retainer for holding said balls in spaced relation to each other.

FRED F. MILLER, JR.